(12) United States Patent
Matsumoto (10) Patent No.: US 7,581,134 B2
(45) Date of Patent: Aug. 25, 2009

(54) OPTICAL DISK RECORDER

(75) Inventor: Shinsuke Matsumoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 397 days.

(21) Appl. No.: 11/518,886

(22) Filed: Sep. 12, 2006

(65) Prior Publication Data
US 2007/0074089 A1 Mar. 29, 2007

(30) Foreign Application Priority Data
Sep. 13, 2005 (JP) ............................. 2005-265773

(51) Int. Cl.
*G06F 11/00* (2006.01)
(52) U.S. Cl. ........................... 714/8; 369/53.15
(58) Field of Classification Search ............. 714/8; 369/53.15
See application file for complete search history.

(56) References Cited

U.S. PATENT DOCUMENTS

| | | | |
|---|---|---|---|
| 6,549,976 B2 * | 4/2003 | Ando et al. | 711/112 |
| 6,816,446 B2 * | 11/2004 | Yoshida et al. | 369/53.24 |
| 6,851,071 B2 * | 2/2005 | Bossen et al. | 714/5 |
| 2001/0021983 A1 * | 9/2001 | Ono et al. | 714/8 |
| 2003/0198155 A1 | 10/2003 | Go et al. | |
| 2004/0064754 A1 * | 4/2004 | Lee | 714/8 |
| 2006/0146666 A1 | 7/2006 | Ueda et al. | |
| 2007/0079173 A1 * | 4/2007 | Park et al. | 714/8 |

FOREIGN PATENT DOCUMENTS

| | | |
|---|---|---|
| JP | 2002-230889 A | 8/2002 |
| JP | 2003-272148 A | 9/2003 |
| JP | 2003272148 A * | 9/2003 |
| JP | 2003-317255 A | 11/2003 |
| JP | 2004-319023 A | 11/2004 |
| WO | WO 2004/079739 A1 | 9/2004 |

OTHER PUBLICATIONS

Japanese Office Action dated Nov. 27, 2007 including English translation (Four (4) pages).

* cited by examiner

*Primary Examiner*—Yolanda L Wilson
(74) *Attorney, Agent, or Firm*—Crowell & Moring LLP (57) ABSTRACT

In an optical disk recorder which records data in a recordable form in compliance with UDF, when writing of a data block constituting a user data file and a control data file is failed (NO in #2), that data block is rewritten (#5). When the writing of all data constituting the user data file and the control data file is completed (that is, when the writing of the data block constituting the user data file and the control data file is completed) (YES in #3), FE, VAT, and VATICB, which are file management data, respectively, are written (#6). When the writing of the FE, the VAT, and the VATICB are failed (NO in #7), that FE, VAT, and VATICB are rewritten (#8), and when the writing of the FE, VAT, and VATICB is completed (YES in #7), a recording operation is completed. Thereby, even when reproducing the data in the data file from the optical disk in which the writing of the data in the data file is failed, the data in the data file can be reproduced with the rewritten data correctly.

5 Claims, 4 Drawing Sheets

OPTICAL DISK RECORDER

BACKGROUND OF THE INVENTION

1. Field of the Invention

The present invention relates to an optical disk recorder for recording data into an optical disk such as a DVD or the like.

2. Description of the Related Art

Conventionally, there is an optical disk recorder which records data of videos, audios, and so on in a recordable form in compliance with UDF (Universal Disk Format) into a write-once optical disk such as a DVD-R and so on. With regard to such optical disk recorder, user data file composed of user data such as video data and audio data used by a user and control data file composed of file control data to control the user data in the user data file are separated into data blocks of predetermined capacity and written the data blocks into an optical disk. File management data to manage positions of the respective data blocks which is comprised of these user data file and the control data file is further written into the optical disk.

Reproduction of the user data from the optical disk is performed by specifying written positions of the respective data blocks constituting the user data file and the control data file based on the file management data, reading out the user data and the control data in those data blocks, respectively, and then processing the user data based on the control data.

On the other hand, in another conventional optical disk recorder, for example, shown in Japanese Laid-Open Patent Publication No. 2003-272148, which records data into a CD-RW which is a rewritable (overwriting) optical disk with a recording method in compliance with the UDF, presence or absence of a recording error of the file management data recorded into the optical disk is confirmed. When there is a recording error in the file management data, the user data file and the file management data are rewritten (overwritten) into the optical disk with setting a recording power for a high level.

In still another conventional optical disk recorder, for example, shown in Japanese Laid-Open Patent Publication No. 2004-319023, a servo signal of an optical head is detected when recording data into an optical disk, and in case that the servo signal of the optical head goes out of a specified value, recording rate of the data is reduced for preventing the recording error. In still another conventional optical disc recorder, for example, shown in Japanese Laid-Open Patent Publication No. 2003-317255, presence or absence of recording error on the optical disk is confirmed, and in case that the number of occurrences of the recording error exceeds a reference value, recording rate of the data is reduced for upgrading recording quality.

In the meanwhile, in case of writing the data blocks which constitutes the user data file and the control data file, when the writing of the user data and the control data in the data blocks is failed, that is, writing error occurs, the data cannot be read out correctly during a reproduction. When the user data in the data block constituting the user data file is failed, the user data such as video data and audio data corresponding to the data block where the writing error occurs cannot be reproduced correctly. When the control data in the data block constituting the control data file is failed, all the user data in the user data file cannot be reproduced because the control data affects the control of the user data in all the data blocks constituting the user data file.

However, with regard to the optical disk recorder which records the data in the recordable form in compliance with the conventional UDF described above, there is no measure for the failure of writing the data in the data blocks. Therefore, it is considered to check whether writing of the data of each data block is succeeded or not, and when the writing of the data of the data block is failed, to rewrite the data of the data block.

Since the write-once optical disk is used in the optical disk recorder which records the data in the recordable form in compliance with the UDF, the data of the data block cannot be rewritten at the same position on the optical disk, again. Thus, in order to rewrite the data of the data block into the optical disc, it is necessary to write the data of the data block at different position on the optical disc. However, when the data block is simply rewritten at different position on the optical disk, the position where the data block is rewritten is not managed by the file management data, and thus when reproducing the user data in the user data file from the optical disk, the position of the data block or data blocks which is or are rewritten again cannot be specified, so that the user data cannot be reproduced perfectly.

SUMMARY OF THE INVENTION

The present invention is to solve the problem described above, and an object of the present invention is to provide an optical disk recorder recording data in a recordable form in compliance with the UDF which can prevent data from not being reproduced from an optical disk caused by a failure of writing of the data into the optical disk.

In order to achieve the object described above, an optical disc recorder in accordance with an aspect of the present invention comprises a recording means to record data with irradiating light beams on an optical disk and a recording control means which controls recording of data into the optical disk with the recording means in a recordable form in compliance with UDF (Universal Disk Format). The recording control means has a file writing means to write a data file composed of one group of data into the optical disk and a file management data writing means to write a file management data to manage writing positions of the data file. When writing of data which constitute the data file is failed, the file writing means rewrites a data block or a data of predetermined capacity including the data at another position on the optical disc, and the file management data writing means writes a file management data corresponding to the rewritten data block or data file.

According to such a constitution, when the writing of the data in the data file into the optical disk is failed, the data are rewritten at another position on the optical disk, and the file management data including this rewriting position of the data is written into the optical disk. Accordingly, even when reproducing the data in the data file from the optical disk in which the writing of the data in the data file is failed, the data in the data file can be reproduced with the rewritten data correctly, in compliance with the file management data including the rewriting position of the data failed to be written.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIGS. 2A and 2B are drawings showing examples of write states of user data files, control data files, and file management data in an optical disk used in the optical disk recorder, wherein

FIGS. 4A to 4D are drawings showing examples of writing processes of user data files, control data files, and file management data into the optical disk with the data recording operation of the optical disk recorder, wherein

DESCRIPTION OF THE PREFERRED EMBODIMENTS

Figure 1:
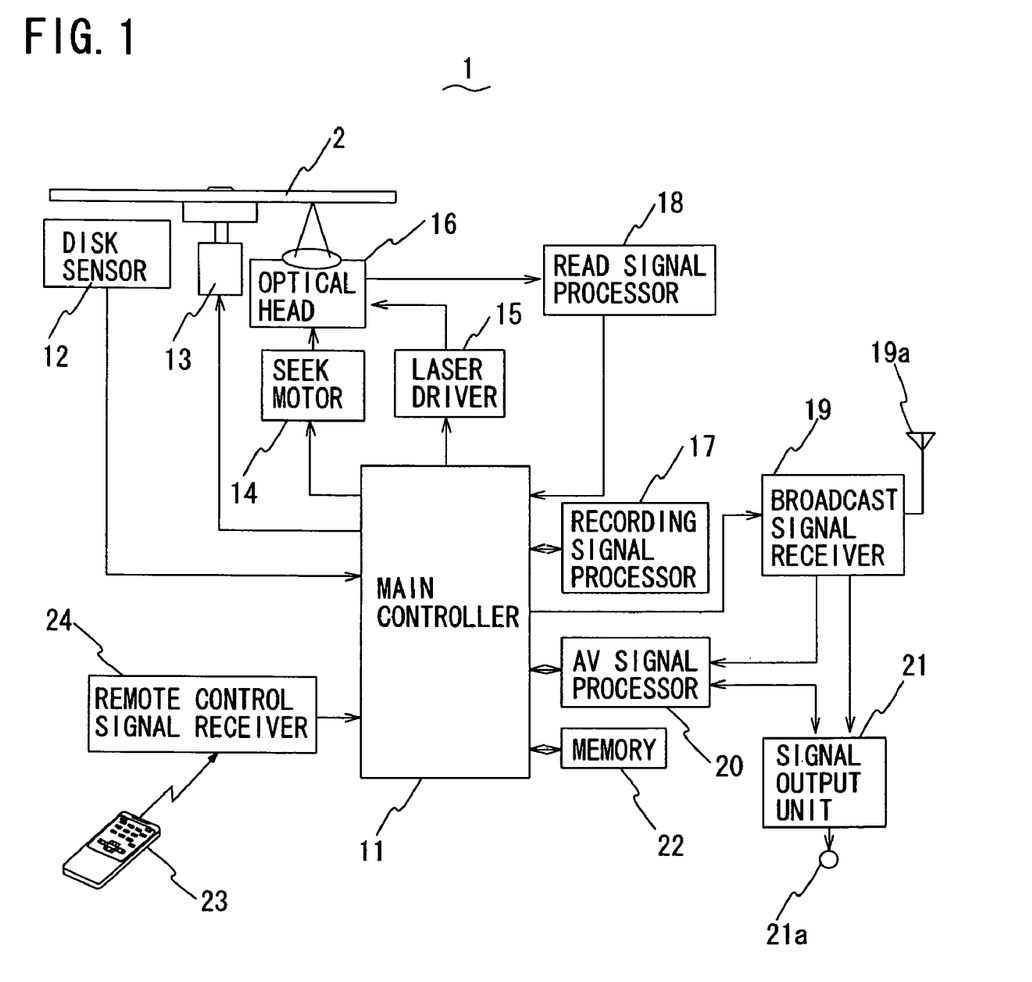
FIG. 1 is an electrical block diagram showing a schematic composition of an optical disk recorder in accordance with an embodiment of the present invention.

An optical disk recorder in accordance with an embodiment of the present invention is described with reference to drawings hereinafter. FIG. 1 shows a composition of an optical disk recorder. An optical disk recorder 1 is a device which records and/or reproduces data of videos, audios, and so on in a recordable form in compliance with the UDF (Universal Disk Format) on a write-once optical disk 2 such as a DVD-R and so on.

The optical disk recorder 1 comprises a main controller 11 serving as a recording control means which is composed of a CPU and so on to control entire of the optical disk recorder 1, a disk sensor 12, a spindle motor 13, a seek motor 14, a laser driver 15, an optical head 16 serving as a recording means, a recording signal processor 17, a read signal processor 18, a broadcast signal processor 19, an AV signal processor 20, a signal output unit 21, a memory 22, a remote control 23, and a remote control signal receiver 24.

The disk sensor 12 detects whether the optical disk 2 is inserted into a disk inserting portion (not shown) or not and outputs a signal to the main controller 11. The optical disk 2 inserted into the disk inserting portion is attached to the spindle motor 13. The spindle motor 13 is driven under control of the main controller 11 for rotating the optical disk 2. The seek motor 14 is composed of a linear motor and moves the optical head 16 in a radial direction of the optical disk 2 under control of the main controller 11. The motion of the optical head 16 is called seek operation. The laser driver 15 controls power and timings of light beams emitted from the optical head 16 under control of the main controller 11.

The optical head 16 irradiates the laser beams on the optical disc 2 for forming recording marks each having a lower reflectivity than its periphery on the optical disk 2, so that data are recorded in the optical disc 2. Moreover, the optical head 16 reads out the data recorded in the optical disk 2 by irradiating the laser beam on the optical disk, receiving reflected lights from the optical disk 2, and outputting read signals having voltage levels according to intensities of the reflected lights. The power of the laser beam to read out the data from the optical disk 2 is lowered than the power of the laser beam to record the data in the optical disk 2 so as not to form recording marks on the optical disk 2.

The recording signal processor 17 generates modulation recording signals by modulating the recording signals to record the data in the optical disk 2 under control of the main controller 11. The read signal processor 18 reproduces the recording signals which are recorded in the optical disk 2 by performing waveform equalization, demodulation, and error correction to the read signals which are read out from the optical disk 2.

The broadcast signal processor 19 reproduces video signals and audio signals included in TV broadcast signals by receiving the TV broadcast signals delivered from a broadcast station through an antenna 19a, and demodulating the TV broadcast signals under control of the main controller 11. The AV signal processor 20 generates recording signals to record data into the optical disk 2 by encoding the video signals and the audio signals reproduced with the broadcast signal processor 19 under control of the main controller 11. Furthermore, the AV signal processor 20 reproduces video signals and audio signals by decoding the recording signals reproduced with the read signal processor 18 under control of the main controller 11. The signal output unit 21 outputs the video signals and the audio signals, which are reproduced with the broadcast signal processor 19, and the video signals and the audio signals, which are reproduced with the AV signal processor 20, to a display and a speaker, which are not shown in the drawings, through the signal output terminals 21a.

The memory 22 temporarily stores the recording signals, which are generated by the AV signal processor 20, and the modulation recording signals, which are generated by the recording signal processor 17, when recording the data in the optical disk 2, and also temporarily stores the recording signals, which are reproduced with the read signal processor 18, when reproducing the data from the optical disk 2 under control of the main controller 11.

The remote controller 23 is operated by a user so as to indicate various operations of the optical disk recorder 1 such as selection of receiving channel of the TV broadcast signals, recording of videos and audios delivered with the TV broadcast signal into the optical disk 2, reproducing of the videos and the audios recorded in the optical disk 2, and so on. The remote controller 23 has various operation keypads operated by the user so as to indicate the various operations of the optical disk recorder 1, and transmits infrared light signals corresponding to the operations when the various operation keys are operated. The remote control signal receiver 24 receives the infrared light signals transmitted from the remote controller 23, converts the infrared light signals into electrical signals, and then outputs signals corresponding to the operations of the remote controller 23 to the main controller 11.

The main controller 11 judges the contents of indications through the operation of the remote controller 23 based on output signals from the remote control signal receiver 24 and also judges whether the optical disk 2 is inserted or not based on a detection signal from the disk sensor 12. Furthermore, the main controller 11 controls the recording operation that the data of the videos, the audios, and so on included in the TV broadcast signals are recorded into the optical disk 2 as the user data which can be used by the user, based on the contents of the indication through the operation of the remote controller 23 and a state whether the optical disk 2 is inserted or not, and also controls the reproducing operation that the data of the videos, the audios, and so on recorded in the optical disk 2 as the user data. Still furthermore, the main controller 11 controls the various operation of the optical disk recorder 1.

The recording of the data of the videos, the audios, and so on included in the TV broadcast signals into the optical disc 2 is performed by generating the recording signals in the AV signal processor 20 based on the video signals and the audio signals included in the TV broadcast signals which are obtained from the broadcast signal processor 19, generating the modulation recording signals in the recording signal processor 19 based on that recording signals, and forming pits each having a length and an alignment corresponding to that modulation recording signals in the optical disk 2. The reproduction of the data of the videos and the audios recorded in the optical disk 2 is performed by reproducing the recording signals in the read signal processor 18 based on the read signals obtained from the optical head 16, reproducing the video signals and the audio signals in the AV signal processor 20 based on that recording signals, and then outputting that video signals and the audio signals from the signal output unit 21 to the display and the speaker.

The main controller 11 controls the recording and the reproducing of the data in the optical disk 2 in the recordable form in compliance with the UDF. That is to say, the data of the videos, the audios, and so on included in the TV broadcast signals are recorded by writing the data of the successive videos, audios, and so on included in the TV broadcast signals in the optical disk 2 as the user data file which is composed of one group of the user data, writing the control data file composed of the control data to control the user data in the user data file (the successive videos and audios) in the optical disk 2, and writing the file management data to manage the writing positions of these user data file and the control data file in the optical disk 2.

At this time, the user data file and the control data file are divided into the data blocks of predetermined capacity and written in a non-recorded area in the optical disk 2. As for the file management data, FE (File Entry), VAT (Virtual allocation Table), and VATICB (Virtual allocation Table Information Control Block) are further written in the non-recorded area in the optical disk 2.

The FE is a data indicating a writing position of each data block constituting the user data file and the control data file when writing the new user data file in the optical disk 2. The VAT is a data indicating a relationship between the writing position of the data block indicated by the FE (that is, when writing a new user data file) and a writing position of the data block additionally written to update the user data in the user data file. The VATICB is a data indicating the writing position of the VAT and is written in an end of each recorded area.

Updating of the user data file which is already written in the optical disk 2 is performed by writing additionally the data block for updating the user data in the non-recorded area in the optical disk 2, writing additionally the VAT, whose contents are updated, in the non-recorded area in the optical disk 2, and then writing additionally the VATICB, whose contents are updated, in the non-recorded area in the optical disk 2.

Reproduction of the user data file (the successive videos and audios) written in the optical disk 2 is performed by specifying the writing positions of the respective data blocks constituting the user data file and the control data file based on the FE, the VAT, and the VATICB, which are written in the optical disk 2, with following the user data and the control data in their respective data blocks.

Figure 2A:
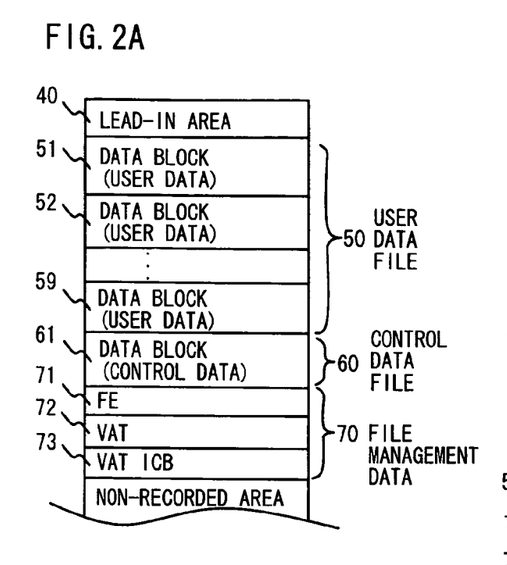
FIG. 2A shows a write state of the user data files, the control data files, and the file management data when writing a new user data file.

FIG. 2A shows an example of writing the user data file, the control data file, and the file management data in the optical disk 2 in case of recording the new data of the videos, the audios, and so on included in the TV broadcast signals in the optical disk 2 (that is, in case of writing the new user data file in the optical disk 2). In the example shown in FIG. 2A, data blocks 51, 52, . . . , and 59 constituting a user data file 50, a data block 61 constituting a control data file 60, and an FE 71, a VAT 72, and a VATICB 73 constituting a file management data 70 are written in an area continuing into a lead-in area 40.

The data blocks 51, 52, . . . , and 59 are composed of the user data of the videos, the audios, and so on included in the TV broadcast signals, respectively. The data block 61 is composed of the control data to control the user data in the respective data blocks 51, 52, . . . , and 59. The FE 71 indicates writing positions of the data blocks 51, 52, . . . , and 59 and the data block 61. The VAT 72 indicates writing positions of the data blocks 51, 52, . . . , and 59 and the data block 61 (in the example shown in FIG. 2A, there is no data block additionally written to update the user data, thus the writing positions of the data blocks 51, 52, . . . , and 59 and the data block 61 are indicated). The VATICB 73 indicates a writing position of the VAT 72. In the lead-in area 40, a writing position of the FE 71 is written.

In the example shown in FIG. 2A, the writing position of the FE 71 is specified by reading out the lead-in area 40, and then the writing position of the VAT 72 is specified by reading out the VATICB 73 (the end of the recorded area). Also, the writing positions of the data blocks 51, 52, . . . , and 59 and the data block 61 are specified by reading out the FE 71 and the VAT 72. Thereby, the user data in the data blocks 51, 52, . . . , and 59 are reproduced as the user data constituting the user data file 50 with reading out the data blocks 51, 52, . . . , and 59 and the data block 61 and processing them.

Figure 2B:
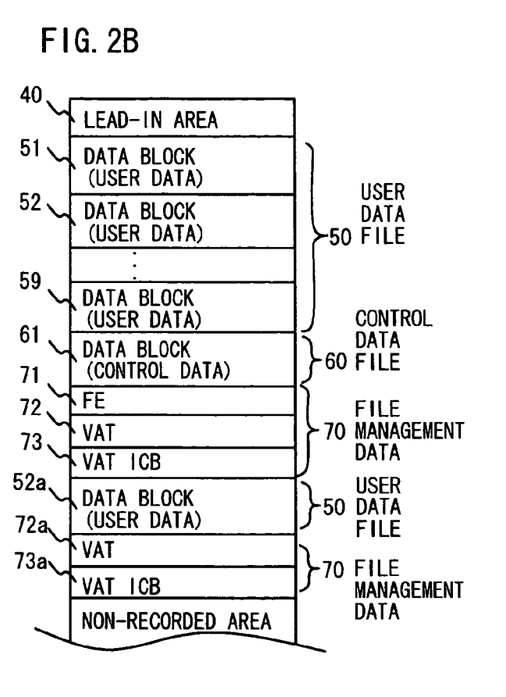
FIG. 2B shows a write state of the user data files, the control data files, and the file management data when updating a user data file which is already written.

FIG. 2B shows an example of writing the user data file, the control data file, and the file management data in the optical disk 2 in case of updating the user data in the user data file written in the optical disk 2. In the example shown in FIG. 2B, a data block 52a, a VAT 72a, and a VATICB 73a are written in an area continuing to a recording position of the VATICB 73.

The data block 52a is written additionally to update contents of the data block 52. The VAT 72a is written additionally to update the VAT 72 in response to the addition of the data block 52a and then indicates a relationship between the writing position of the data block 52 and a writing position of the data block 52a (that is, a conversion of the data block 52 into the data block 52a). The VATICB 73a is written additionally to update the VATICB 73 in response to the addition of VAT 72a and then indicates a writing position of the VAT 72a.

In the example shown in FIG. 2B, the writing position of the FE 71 is specified by reading out the lead-in area 40, and then the writing position of the VAT 72a is specified by reading out the VATICB 73a (the end of the recorded area). Also, the writing positions of the data blocks 51, 52a, . . . , and 59 and the data block 61 are specified by reading out the FE 71 and the VAT 72a. Thereby, the user data in the data blocks 51, 52a, . . . , and 59 are reproduced as the user data constituting the user data file 50 with reading out the data blocks 51, 52a, . . . , and 59 and the data block 61 and processing them.

Figure 3:
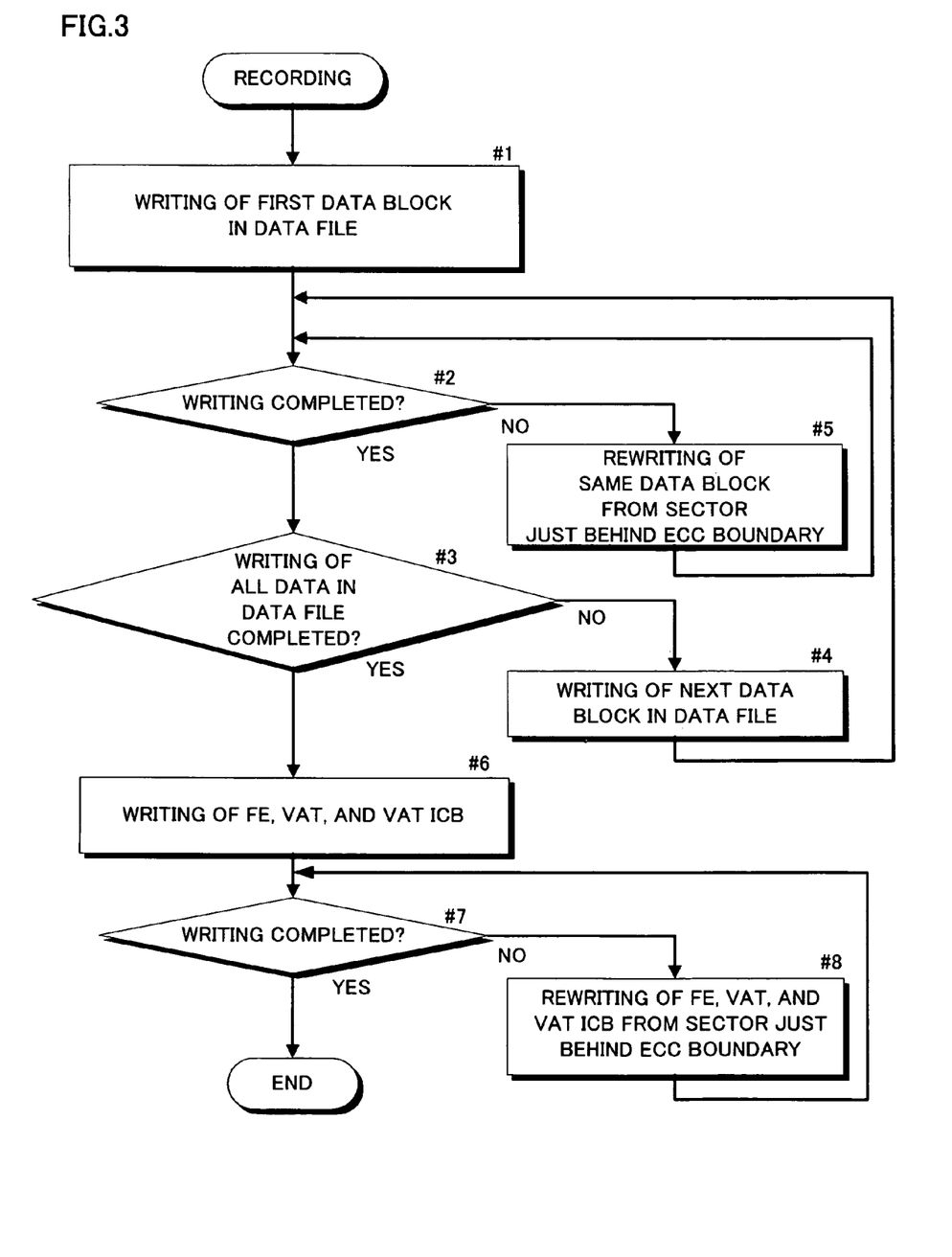
FIG. 3 is a flowchart showing a data recording operation of the optical disk recorder when writing the user data files.

FIG. 3 is a flowchart of a recording operation in case of recording the new data of the videos, the audios, and so on included in the TV broadcast signals in the optical disk recorder 1 (that is, in case of writing a new user data file in the optical disk 2). First, the main controller 11 writes the first data block in the data file into the optical disk 2 (#1). When the writing of the data block is succeeded (YES in step #2), the main controller 11 judges whether the writing of all data in the data file is completed or not (#3). When the writing of all data in the data file is not completed (NO in step #3), the main controller 11 writes the next data block in the data file (#4), and then repeats the processes from the step #2 described above. In this manner, each data file is written in units of the data block into the optical disk 2.

When the writing of the data block is failed through the process of the step #2 in course of writing the data file in units of the data block in the optical disk 2 (NO in step #2), the main controller 11 rewrites that data block from a sector just behind the ECC (Error Correcting Code) boundary (#5). This rewriting process of the step #5 is repeated until the writing of that data block is succeeded. Accordingly, the next data block is written after completing the writing of the previous data block. The file writing means is composed of the processes of the steps #1 to #5.

When the writing of all data in the data file is completed (YES in step #3), the main controller 11 writes the FE, the VAT, and the VATICB, which are the file management data, respectively (#6). In particular, the FE, the VAT, and the VATICB are written after completing the writing of all data blocks in the data file. When the writing of the FE, the VAT, and the VATICB is succeeded (YES in step #7), the main controller 11 completes the recording operation.

Alternatively, when the writing of the FE, the VAT, or the VATICB is failed (NO in step #7), the main controller 11 rewrites the FE, the VAT, or the VATICB into a sector just behind the ECC boundary (#8). This rewriting process of the step #8 is repeated until the writing of that FE, VAT, and VATICB are succeeded. When the writing of that FE, VAT, and VATICB (YES in #7) is succeeded, the main controller 11 completes the recording operation. The file management data writing means is composed of the process of the steps #6 to #8.

Figure 4A:
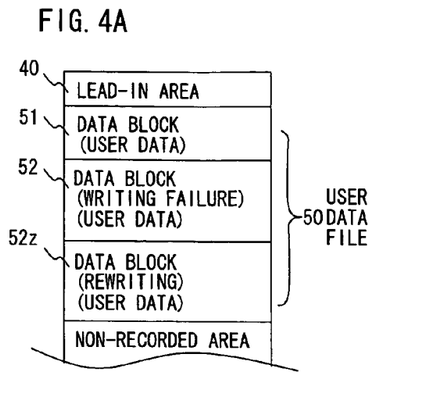
FIG. 4A shows a rewrite state of data blocks constituting user data.
Figure 4B:
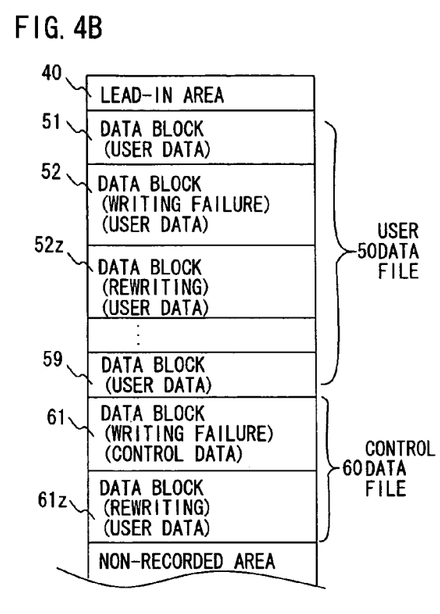
FIG. 4B shows a rewrite state of data blocks constituting the control data files.

FIGS. 4A to 4B are drawings showing examples of writing processes of the user data file, the control data file, and the file management data through the recording operation described above. According to the recording operation described above, as shown in FIG. 4A, the data blocks 51 and 52 constituting the user data file 50 are written first. In case that the writing of the data block 52, for example, is failed at this time, a data block 52z composed of an original user data in writing the data block 52 without failure is rewritten in an area continuing to the recording position of the data block 52.

Then, as shown in FIG. 4B, the writing is continued until the data block 61 constituting the control data file 60 is written. For example, when the writing of the data block 61 is failed, a data block 61z composed of an original control data in writing the data block 61 without failure is rewritten in an area continuing to the recording position of the data block 61.

Figure 4C:
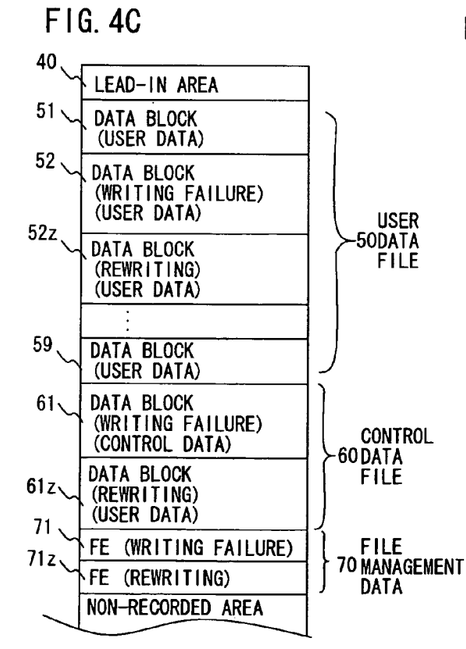
FIG. 4C shows a rewrite state of FE (File Entry) constituting the file management data.

Subsequently, the FE 71 is written as shown in FIG. 4C. This FE 71 corresponds to the rewritings of the data blocks 52z and 61z, and indicates the writing positions of the data blocks 51, 52z, . . . , 59, and 61z. For example, when the writing of the FE 71 is failed at this time, an FE 71z indicating the writing positions of the original data blocks 51, 52z, . . . , 59, and 61z in writing the FE 71 without failure is rewritten in an area continuing to the recording position of the FE 71.

Figure 4D:
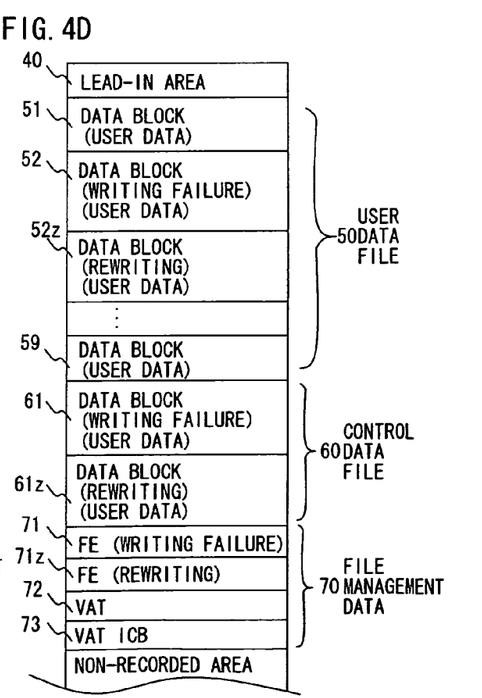
FIG. 4D shows a state of completing writings of the user data files, the control data files, and the file management data.

And then, as shown in FIG. 4D, the VAT 72 and the VATICB 73 are written and the recording operation is completed. Besides, in case that no failure occurs in writing any data block and file management data, the user data file, the control data file, and the file management data are written as shown in FIG. 2A described above.

According to the optical disk recorder 1 having such a composition, when the writing of the data block constituting the user data file or the control data file in the optical disk 2 is failed, that data block is rewritten in the area just behind the ECC boundary, and after this rewriting, the FE, the VAT, and the VATICB which are the file management data corresponding to this rewriting position are written in the optical disk 2. Thus, even when reproducing the user data in the user data file from the optical disk 2 in which the writing of the data block is failed, the user data in the user data file can be reproduced with the rewritten data block, based on the FE, the VAT, and the VATICB corresponding to the rewriting position of the data block which is failed to be written.

Furthermore, the rewriting of the data block is repeated until the writing of that data block is succeeded, and the FE, the VAT, and the VATICB are written after completing the writing of all control data of all user data and control data in the user data file, thus the user data in the user data file can be reproduced more definitely.

Still furthermore, the writing of the FE, the VAT, and the VATICB in the optical disk 2 is failed, the FE, the VAT, or the VATICB is rewritten in an area just behind an ECC boundary. Accordingly, even when reproducing the data in the user data file from the optical disk 2 in which the writing of the FE, the VAT, or the VATICB is failed, the data in the user data file can be reproduced based on the rewritten FE, VAT, or VATICB. Still furthermore, the rewriting of the FE, the VAT, or the VATICB is repeated until the writing of that FE, VAT, or VATICB is succeeded, so that the data in the user data file can be played more definitely.

The present invention is not limited to the composition in the embodiments described above, however, various modifications are applicable. For example, the optical disk 2 is not limited to a DVD-R, however, other recording medias may be applicable only if the recordable form based on UDF is applicable. Furthermore, the user data recorded in the optical disk 2 is not limited to the data of the videos, the audios, and so on. However, the data of music, documents, and so on is applicable.

This application is based on Japanese patent application 2005-265773 filed Sep. 13, 2005 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An optical disc recorder, comprising:
a recording means to record data with irradiating light beams on an optical disk; and
a recording control means which controls recording of data into the optical disk with the recording means in a recordable form in compliance with UDF (Universal Disk Format), wherein
the recording control means has a file writing means to write a data file composed of one group of data into the optical disk and a file management data writing means to write a file management data to manage writing positions of the data file;
when writing of data which constitute the data file is failed, the file writing means rewrites a data block or a data of predetermined capacity including the data at another position on the optical disc, and the file management data writing means writes a file management data corresponding to the rewritten data block or data file;
wherein when the file writing means writes a user data file composed of a user data used by a user, the file writing means writes a control data file composed of a control data to control the user data in the user data file additionally, and also writes the user data file and the control data file with dividing into data blocks of predetermined capacity; and
wherein when writing of a data block constituting a user data file and a control data file is failed, the file writing means rewrites the data block in an area just behind an ECC (Error Correcting Code) boundary and repeats this rewriting until this writing of that data block is succeeded.

2. The optical disc recorder in accordance with claim 1, wherein the file management data writing means writes an FE (File Entry) which indicates a writing position of a data block constituting a user data file and a control data file when writing a new user data file, a VAT (Virtual allocation Table) which indicates a relationship between a writing position of a data block indicated by the FE and a writing position of a data block additionally written to update a user data in a user data file, and a VATICB (Virtual allocation Table Information Control Block) which indicates a writing position of VAT;

the file management data writing means writes the FE, the VAT, and the VATICB after completing writing of all control data of all user data and control data files in a user data file with a file writing means, and when writing of the FE, the VAT, or the VATICB is failed, the file management data writing means rewrites the FE, the VAT, or the VATICB in an area just behind an ECC boundary and repeats this rewriting until this writing of the FE, the VAT, and the VATICB is succeeded.

3. An optical disc recorder, comprising:

a recording means to record data with irradiating light beams on an optical disk; and a recording control means which controls recording of data into the optical disk with the recording means in a recordable form in compliance with UDF (Universal Disk Format), wherein the recording control means has a file writing means to write a data file composed of one group of data into the optical disk and a file management data writing means to write a file management data to manage writing positions of the data file;

when writing of data which constitute the data file is failed, the file writing means rewrites a data block or a data of predetermined capacity including the data at another position on the optical disc, and the file management data writing means writes a file management data corresponding to the rewritten data block or data file;

wherein the file management data writing means writes an FE (File Entry) which indicates a writing position of a data block constituting a user data file and a control data file when writing a new user data file, a VAT (Virtual allocation Table) which indicates a relationship between a writing position of a data block indicated by the FE and a writing position of a data block additionally written to update a user data in a user data file, and a VATICB (Virtual allocation Table Information Control Block) which indicates a writing position of VAT; and wherein when writing of the FE, the VAT, or the VATICB is failed, the file management data writing means rewrites the FE, the VAT, or the VATICB in an area just behind an ECC boundary and repeats this rewriting until this writing of the FE, the VAT, and the VATICB is succeeded.

4. An optical disc recorder, comprising:

a recording means to record data with irradiating light beams on an optical disk; and a recording control means which controls recording of data into the optical disk with the recording means in a recordable form in compliance with UDF (Universal Disk Format), wherein the recording control means has a file writing means to write a data file composed of one group of data into the optical disk and a file management data writing means to write a file management data to manage writing positions of the data file;

when writing of data which constitute the data file is failed, the file writing means rewrites a data block or a data of predetermined capacity including the data at another position on the optical disc, and the file management data writing means writes a file management data corresponding to the rewritten data block or data file;

wherein when the file writing means writes a user data file composed of a user data used by a user, the file writing means writes a control data file composed of a control data to control the user data in the user data file additionally, and also writes the user data file and the control data file with dividing into data blocks of predetermined capacity; and wherein the file management data writing means writes an FE (File Entry) which indicates a writing position of a data block constituting a user data file and a control data file when writing a new user data file, a VAT (Virtual allocation Table) which indicates a relationship between a writing position of a data block indicated by the FE and a writing position of a data block additionally written to update a user data in a user data file, and a VATICB (Virtual allocation Table Information Control Block) which indicates a writing position of VAT;

the file management data writing means writes the FE, the VAT, and the VATICB after completing writing of all control data of all user data and control data files in a user data file with a file writing means, and when writing of the FE, the VAT, or the VATICB is failed, the file management data writing means rewrites the FE, the VAT, or the VATICB in an area just behind an ECC boundary and repeats this rewriting until this writing of the FE, the VAT, and the VATICB is succeeded.

5. An optical disk recorder, comprising:

a recording means to record data with irradiating laser beam on an optical disk; and a recording control means which controls recording of data on the optical disk with the recording means in a recordable form in compliance with UDF (Universal Disk Format), wherein the recording control means has a file writing means to write a data file composed of one group of data into the optical disk and a file management data writing means to write a file management data to manage writing positions of the data file, when the file writing means writes a user data file composed of a user data used by a user, the file writing means writes a control data file composed of a control data to control the user data in the user data file additionally, and also writes the user data file and the control data file with dividing into data blocks of predetermined capacity;

the file management data writing means writes an FE (File Entry) which indicates a writing position of a data block constituting a user data file and a control data file when writing a new user data file, a VAT (Virtual allocation Table) which indicates a relationship between a writing position of a data block indicated by the FE and a writing position of a data block additionally written to update a user data in a user data file, and a VATICB (Virtual allocation Table Information Control Block) which indicates a writing position of VAT, and when writing of a data block constituting a user data file and a control data file is failed, the file writing means rewrites the data block in an area just behind an ECC (Error Correcting Code) boundary and repeats this rewriting until this writing of that data block is succeeded, the file management data writing means writes the FE, the VAT, and the VATICB after completing writing of all control data of all user data and control data files in a user data file with a file writing means, and when writing of the FE, the VAT, or the VATICB is failed, the file management data writing means rewrites the FE, the VAT, or the VATICB in an area just behind an ECC boundary and repeats this rewriting until this writing of the FE, the VAT, and the VATICB is succeeded.

* * * * *